US005737725A

United States Patent [19]
Case

[11] Patent Number: 5,737,725
[45] Date of Patent: Apr. 7, 1998

[54] METHOD AND SYSTEM FOR AUTOMATICALLY GENERATING NEW VOICE FILES CORRESPONDING TO NEW TEXT FROM A SCRIPT

[75] Inventor: Eliot M. Case, Denver, Colo.

[73] Assignee: U S WEST Marketing Resources Group, Inc., Englewood, Colo.

[21] Appl. No.: 584,649

[22] Filed: Jan. 9, 1996

[51] Int. Cl.$^6$ .................................................. G10L 5/02
[52] U.S. Cl. ..................... 704/260; 704/273; 704/270; 704/213; 705/26
[58] Field of Search ...................... 395/2.69, 2.79, 395/2.86, 2.87, 2.67, 2.22, 2.46, 226, 227

[56] References Cited

U.S. PATENT DOCUMENTS

| | | | |
|---|---|---|---|
| 4,785,408 | 11/1988 | Britton et al. | 395/2.79 |
| 5,131,045 | 7/1992 | Roth | 395/2.46 |
| 5,278,943 | 1/1994 | Gasper et al. | 395/2.09 |
| 5,283,731 | 2/1994 | Lalonde et al. | 395/226 |
| 5,384,893 | 1/1995 | Hutchins | 395/2.76 |
| 5,400,434 | 3/1995 | Pearson | 395/2.73 |
| 5,526,259 | 6/1996 | Kaji | 395/2.63 |
| 5,592,585 | 1/1997 | Van Coile et al. | 395/2.15 |

*Primary Examiner*—Kee M. Tung
*Attorney, Agent, or Firm*—Brooks & Kushman

[57] ABSTRACT

A method and system for automatically generating at least one new voice file corresponding to at least one new text from a script incorporating a plurality of known text having corresponding preexisting voice files associated therewith. A plurality of phonetic sequences corresponding to the plurality of known text is stored in a first memory. A text input corresponding to a textual version of the script is provided and a text-to-phonetic translator translates the text input to obtain a corresponding textual phonetic sequence based on the plurality of phonetic sequences stored in the first memory. An audio input of the script is provided and a speech recognizer generates an audio phonetic sequence of the audio input. A text-to-speech aligner aligns the text input and the corresponding textual phonetic sequence with the audio input and the corresponding audio phonetic sequence to obtain an alignment of the text input and the audio input. The at least one new voice file is generated based on the alignment. The at least one new voice file may be stored in a second memory with the plurality of pre-existing voice files for use with a concatenated voice playback system.

67 Claims, 2 Drawing Sheets

METHOD AND SYSTEM FOR AUTOMATICALLY GENERATING NEW VOICE FILES CORRESPONDING TO NEW TEXT FROM A SCRIPT

TECHNICAL FIELD

This invention relates to methods and systems for automatically generating and editing new voice files corresponding to new text from a script incorporating a plurality of known text having corresponding preexisting voice files associated therewith.

BACKGROUND ART

There exists communication networks, such as telephone networks, that store and rapidly distribute announcements to a large number of customers. These announcements may be generated by a concatenated voice playback system in which individual voice recordings are concatenated to provide a complete message. One known concatenated voice playback system provides announcements relating to advertisements in an electronic classified system, such as homes or automobiles available for sale. Electronic classified advertising is currently being used to augment printed classified advertising such as found in newspapers, magazines and even the yellow page section of a telephone book. Electronic classified advertising can give a potential user more detail about the product or services being offered than is normally available in a printed ad. As a result, the buyer is able to obtain additional details without having to talk directly to the seller. These electronic ads can be updated frequently to show changes, improvements, changes in cost and the availability of the goods and services being offered.

Existing electronic classified advertising systems have thus helped sellers to sell their goods and services and buyers to locate the products and purchase the same. However, existing electronic advertising systems using voice message systems provide unnatural sounding voice recordings to the user. This result occurs due to the fact that providers of such systems concatenate several voice recordings having various voice inflections, pronunciations, etc., to form the complete announcement.

In order to provide more natural sounding voice messages, the provider of the concatenated playback system may record many possible phrases in a natural speech pattern and then manually edit a section of the phrase from the entire voice recording for use in concatenating with other sections of previously recorded voice recordings. This method, however, is costly and time-consuming.

There exists a need for a method and system for editing a speech pattern from a recorded voice message in a quick and cost-effective manner so as to allow the speech pattern to be concatenated with other previously recorded voice messages to provide more natural sounding voice messages to the user of the concatenated voice playback system.

DISCLOSURE OF THE INVENTION

It is thus a general object of the present invention to provide a method and system for automatically generating and editing at least one new voice file from a script incorporating a plurality of pre-existing voice files.

It is yet another object of the present invention to provide a method and system to provide more natural sounding voice messages in a voice playback system through concatenation of various voice files.

In carrying out the above objects and other objects, features and advantages, of the present invention; a method is provided for automatically generating at least one new voice file corresponding to at least one new text from a script incorporating a plurality of known text having corresponding preexisting voice files associated therewith. The method includes the step of storing a plurality of phonetic sequences corresponding to the plurality of known text in a first memory. The method also includes the steps of providing a text input of the script and translating the text input to obtain a corresponding textual phonetic sequence based on the plurality of phonetic sequences stored in the first memory. The method further includes the steps of providing an audio input of the script and generating an audio phonetic sequence of the audio input. The method also includes the step of aligning the text input and the corresponding textual phonetic sequence with the audio input and the corresponding audio phonetic sequence to obtain an alignment of the text input and the audio input. The method concludes with the step of generating the at least one new voice file based on the alignment.

In further carrying out the above objects and other objects, features and advantages, of the present invention, a system is also provided for carrying out the steps of the above described method. The system includes a first memory for storing a plurality of phonetic sequences corresponding to the plurality of known text. The system also includes means for providing a text input of the script and means for translating a text input to obtain a corresponding textual phonetic sequence based on the plurality of phonetic sequences stored in the first memory. The system further includes means for providing an audio input of the script. Still further, the system includes first means for generating an audio phonetic sequence of the audio input. The system also includes means for aligning the text input and the corresponding textual phonetic sequence with the audio input and the corresponding audio phonetic sequence to obtain an alignment of the text input and the audio input. The system still further includes a second means for generating the at least one new voice file based on the alignment.

The above objects and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
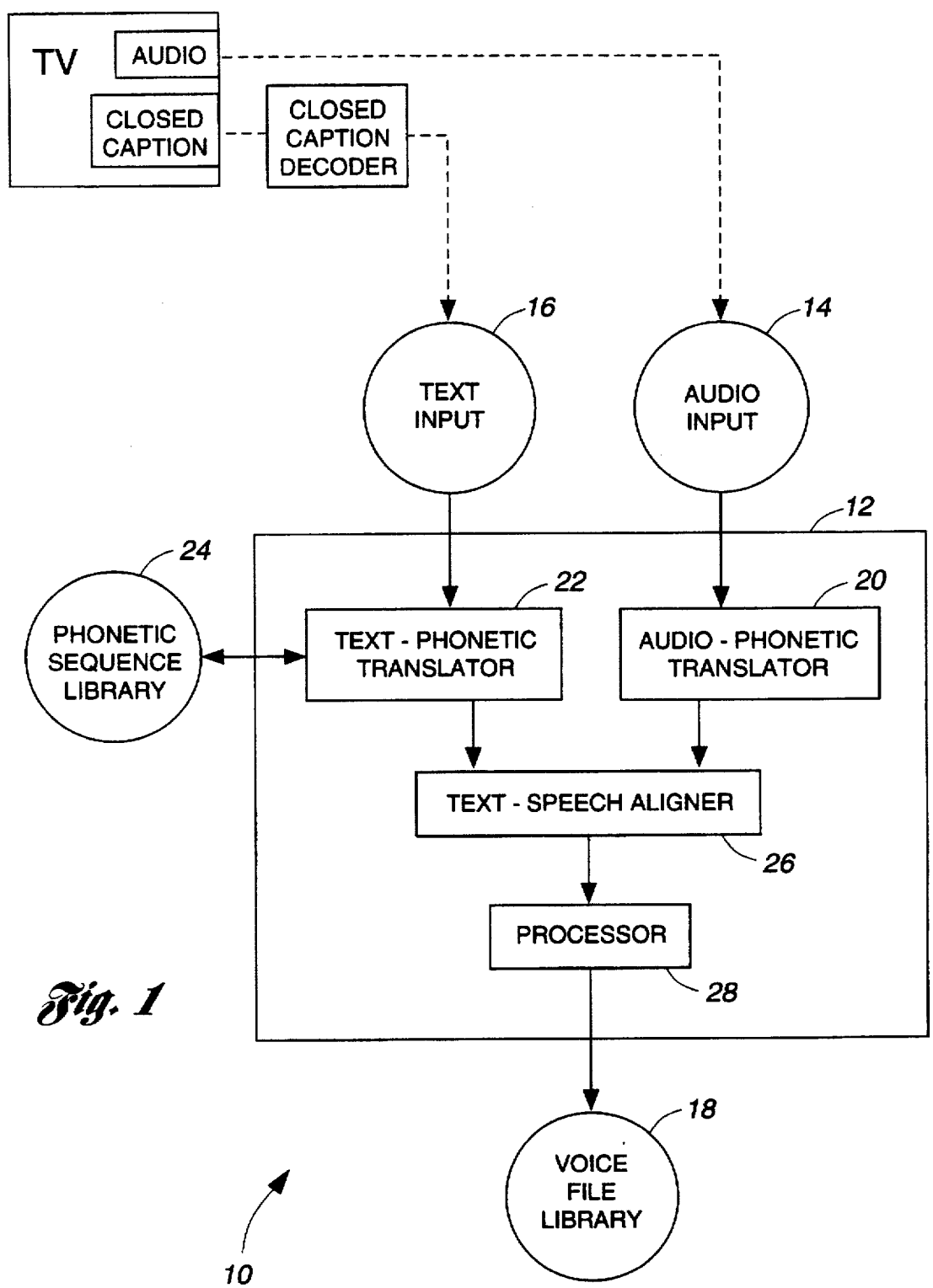
FIG. 1 is a block diagram of the system of the present invention.

Turning now to FIG. 1, there is shown a block diagram of the system of the present invention, denoted generally by reference numeral 10. The system includes an automated voice file cut-down system 12 for receiving and editing various voice files as will be described in greater detail below. The automated voice file cut-down system 12 receives an audio inputs or voice input, from block 14 and a corresponding text input from block 16. The audio and text input comprise a message containing a plurality of speech patterns which includes a portion corresponding to at least one new speech pattern. The new speech pattern(s) is to be cut from the plurality of speech patterns and stored into a voice file library 18.

The voice file cut-down system 12 includes an audio-to-phonetic translator 20 for translating the audio input 14 into a phonetic sequence. The audio-to-phonetic translator may be any conventional speech recognizer that converts an audio speech pattern into a series of phonetics. The voice file cut-down system 12 also includes a text-to-phonetic translator 22 for translating an input in the form of text into a corresponding phonetic sequence. The text-to-phonetic translator 22 utilizes a phonetic sequence library 24 to obtain a phonetic sequence of a text. Thus, the text-to-phonetic translator 22 acts as a dictionary. If a new word or phrase is present and, thus; a phonetic sequence is not available in the phonetic sequence library 24, the new word or phrase is marked accordingly.

The voice file cut-down system 12 further includes a text-to-speech aligner 26 for automatically time aligning the speech patterns of the audio input 14 with the corresponding text input 16. Since the text-to-speech aligner 26 is provided with an accurate word-level transcription of the speech via the text input 16, the text-to-speech aligner 26 needs only to find the corresponding sequence of phones and the optimal time alignment between the text and the speech patterns. This is made possible since the text-to-speech aligner 26 knows the sequence of words being spoken or recorded. A conventional text-to-speech aligner such as the Aligner or the HTK, manufactured by Entropic, may be used. The Entropic Aligner also provides a phonetic transcription of the audio input, thereby eliminating the need for the separate audio-to-phonetic translator 20 of the present invention.

Upon aligning the text input 16 and its corresponding phonetic sequence with the audio input 14 and its corresponding phonetic sequence, the text-to-speech aligner 26 identifies the new word(s) or phrase(s) as the speech pattern not having a phonetic sequence for the equivalent text input 16. The text-to-speech aligner 26 then identifies the beginning and the end of the new speech pattern(s) corresponding to the new word(s) or phrase(s). The new speech pattern(s) can then be separated from the rest of the recorded message.

Finally, the voice file cut-down system 12 includes a processor 28 for processing the corresponding new voice file(s). The phonetic transcription of the audio input corresponding to the new word(s) or phrase(s) is stored in the phonetic sequence library 24. The new voice file(s) is edited according to a plurality of predetermined rules and assigned a file or identification number. Subsequently, the new voice file(s) is stored in the voice file library 18 for future use.

The plurality of voice files stored in the voice file library 18 may be used in conjunction with a concatenated playback system, such as an electronic classified advertisement system. Selected individual voice files are concatenated together in a predetermined sequence to provide a more natural sounding single recorded message.

Figure 2:
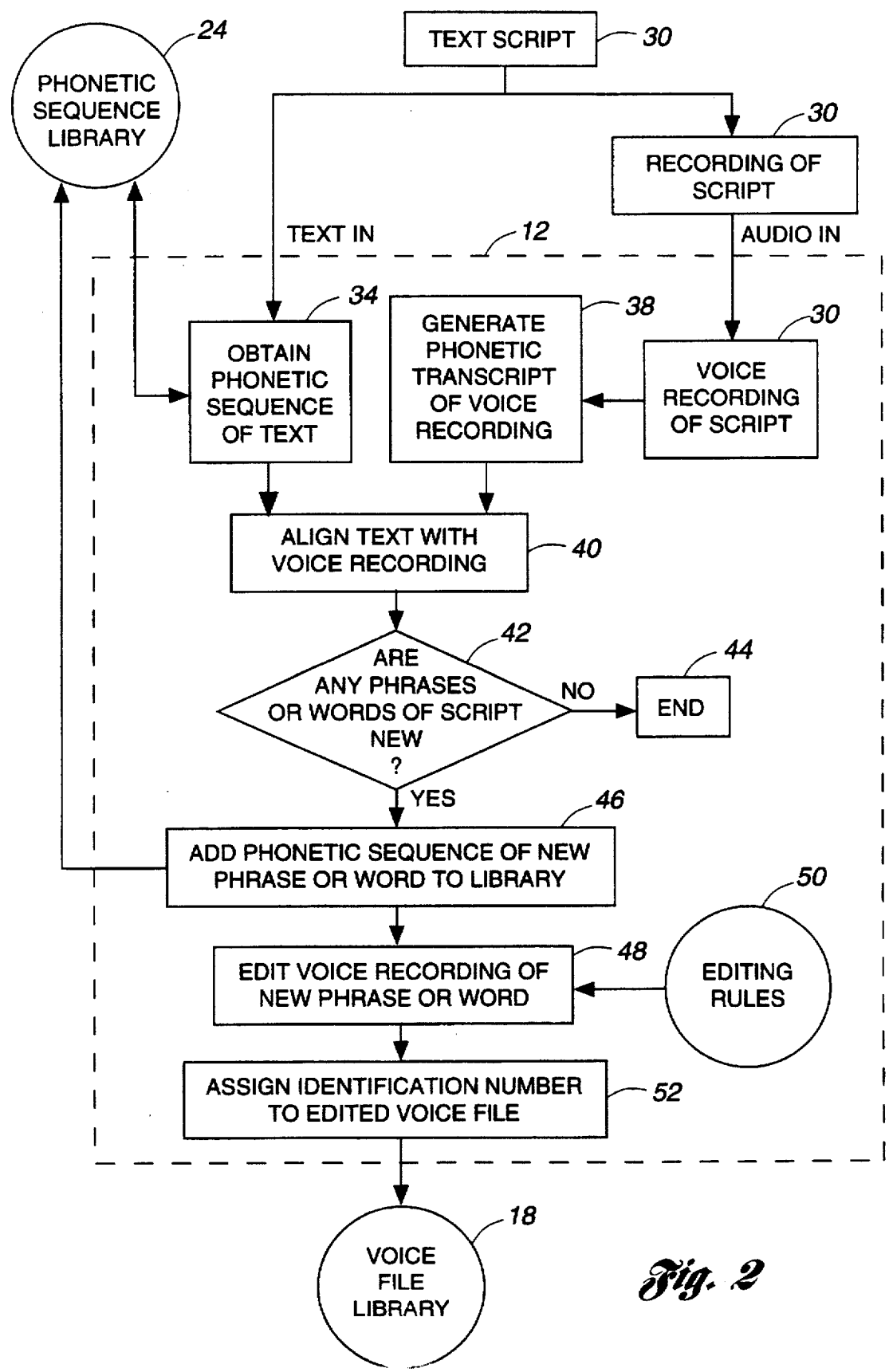
FIG. 2 is a flow diagram illustrating the general sequence of steps associated with the operation of the present invention.

Turning now to FIG. 2, the operation of the system 10 of the present invention will now be described. First, a text script is provided to the voice file cut-down system, as shown at block 30. The text script includes a plurality of words and phrases, some of which have pre-recorded voice files stored in the voice file library 18. An audio input equivalent of the text script is also provided to the voice file cut-down system 12. The audio input may be obtained by having an individual record the text script, as shown at block 32 using, for example, a microphone. Alternatively, the audio input may be provided from a television audio signal while the text script, or input, is provided from a closed caption decoding of the television audio signal.

In the case of an electronic classified advertisement system for real-estate, a script may read as follows:

| | |
|---|---|
| GW1041XU | This home offers |
| QN9125X3 | 1 AND 1/8 th |
| GW1037XU | bedroom and 1 |
| GQ1039XU | bathroom for $25,000 |
| CN0001XU | This frame |
| AR0001XU | A-frame home |
| GW0121XU | sits on a 2500 |
| GW1023XU | square foot lot |
| GW1026XU | and has |
| HE0001XU | gas heat |
| FP0001XU | one fireplace |
| CR0001XU | and a one car garage |
| GW1043XU | This new |
| x | Agent owned home |
| GW1008XU | features |
| LX0001XU | Walk-In Closets |
| LA0001XU | Mountain View |
| LA0023XU | Humidifier |
| GW1017XU | and an |
| LN0001XU | Attic Fan |
| GW1006XU | this home also |
| LM0001XU | Requires a Maintenance Association Fee |
| GW1031XU | for more information call JOE |
| GW1002XU | of |
| GW1032XU | JOES at 7654123 |
| GW1033XU | again, that number is 7654123, | where the alphanumeric character in the left hand column corresponds to an identification number assigned the various phrases, or speech utterances, of the script. New phrases and words are "staged" inside of real scripts and sentences so that the new phrases and words will be read naturally. Those phrases and words having a corresponding alphanumeric character are the new words or phrases to be edited from the entire message. Those phrases or words not having a corresponding alphanumeric character are used as fillers to complete the script.

Such a script may be used for a concatenated voice playback system in which the provider of the playback system is attempting to provide a more natural sounding message to the user of the system. The actual meaning of the content of the scripts is not important as long as the grammar matches the grammar of the voice playback system. A system for providing more natural sounding messages in a voice playback system is described in U.S. Patent application entitled, "A System and Method For Producing Voice Files For An Automated Concatenated Voice System," having Ser. No. 08/587,125, filed Jan. 9, 1996. The messages are segmented into the individual phrases which are each stored in a memory along with an identification number. Upon playing the voice messages to the user, the system concatenates the many phrases to form a complete announcement/message describing the product or services for sale. Many messages are recorded so that the concatenation of the various phrases provides a natural sounding message to the user.

After the text input is provided, the text-to-phonetic translator 22 obtains a phonetic sequence corresponding to the text input, as shown at block 34. For example, a portion of the text script may read as follows: "sufficient enough for." If "sufficient" is the new word in the text script, the textual phonetic sequence translation may result in the following: "_" "ENuhF" "FOR", where "_" indicates the word "sufficient" does not have a corresponding phonetic sequence stored in the phonetic sequence library 24. The portion(s) of the text input not having a phonetic sequence stored in the phonetic sequence library 24 is/are identified as a new phrase(s). Thus, "sufficient" is identified as a new word.

Upon obtaining the audio input, a voice recording of the audio input is stored in an audio file, as shown at block 36. The audio-to-phonetic translator 20 translates the audio recording into a corresponding phonetic sequence, as shown at block 38. In the example given above, the audio recording of the phrase "sufficient enough for" may result in a phonetic translation as follows: "SuhFihshuhNT" "ENuhF or uhNuhF" "FO or FOR or FR," depending upon the speech of the individual recording the text script.

Next, the text-to-speech aligner 26 aligns the text of the script with speech signals corresponding to the audio recording of the phrases or words of the script, as shown at block 40. Thus, the text of "sufficient" and its unknown textual phonetic sequence translation, "_", is aligned with the phonetic transcript "SuhFihshuhNT" corresponding to the audio input of "sufficient." Similarly, "enough" and "ENuhF" is aligned with "ENuhF or uhNuhF," and "for" and "FOR" is aligned with "FO or FOR or FR." The text-to-speech aligner 26 also marks the beginning and end of each word or phrase contained in the script. By comparing the speech patterns of the script with the text input, the text-to-speech aligner 26 automatically identifies the new word(s) or phrase(s) as the speech pattern corresponding to the text input not having a translated phonetic sequence. Thus, the text-to-speech aligner 26 determines if there are any new words or phrases present in the script, as shown at block 42.

If there are no new words or phrases present, the operation of the present invention ends, as shown at block 44. If there are new words or phrases present, the voice file cut-down system 12 adds the phonetic sequence of the new word or phrase to the phonetic sequence library 24, as shown at block 46. The phonetic sequence of the new word or phrase is obtained utilizing the phonetic sequence generated by the audio-to-phonetic translator 20. Thus, in the example given above; the phonetic sequence "SuhFihshuhNT" is added to the phonetic sequence library 24.

The voice file corresponding to the new word or phrase may be edited according to a predetermined set of rules; as shown at block 48. The predetermined set of rules are contained in a corresponding editing rule library 50. This step is performed so that all voice recordings of the many words and phrases are consistent.

For example, if a phrase required to be isolated for concatenation is long enough for an individual to need to take a breath in the middle of the recording, then the breath sound is retained but the level of the breath sound is reduced at least 12 dB to retain the naturalness of the recording. The reduction of the breath sound level will keep half duplex systems; such as speaker phones, from switching off the speaker at the end of the playback. If a faster playback is required or to pass more information to the listener faster, the breath sounds are cue out of the recordings completely so as to join the sounds before the breath to the sounds after the breath.

Secondly, any edit to a phrase is made in a least conspicuous place and as close as possible to a zero crossing. Edits are also made outside of the active portion of the sound. If an edit is required in an active portion of a phrase (such as a beginning or ending "M or N" sound), then a unified standard is applied. Any edit from the end of one phrase to the beginning of the next phrase must attempt to keep a normal continuum of the velocity of the sound. Therefore, all beginnings of recordings if cut in an active wave, should be at zero crossing and going in the zero to positive direction. Also, all endings of recordings if cut in an active wave should be at zero crossing and going in the negative to zero direction. Thus, distortion is minimized when the phrases are concatenated in playback. The edit types could be reversed with the same result, i.e., beginnings going from zero going negative and endings going from positive to zero crossing.

Furthermore, any edit should be made approximately 0.02±0.005 seconds before the start of an isolated phrase. Also, words and phrases beginning with "fricative" sounds, such as "f" and "s", should be edited at the very beginning of the "fricative" sound of the beginning of the isolated phrase.

Any edit should also be made approximately 0.02±0.005 seconds after the end of an isolated phrase. For words and phrases ending with "fricative" sounds, any edit should be made approximately at the very ending of the "fricative" sound of the ending of the isolated phrase.

After the new voice file(s) corresponding to the new phrase(s) has been segmented and edited, the new voice file(s) is assigned an identification number and stored in the voice file library 18, as shown at block 52. A plurality of modified voice files now exist for future use in a concatenated voice playback system. Consequently, the concatenated message sounds more natural to the user of the system.

The operation of the present invention is not limited to an application involving only the English language. It is apparent from the description that the present invention may be used in conjunction with any other spoken language, such as Spanish, German, etc. The operation of the present invention is also capable of responding to slang language of any of the above-mentioned languages.

While the best modes for carrying out the invention have been described in detail, those familiar with the art to which this invention relates will recognize various alternative designs and embodiments for practicing the invention as defined by the following claims.

What is claimed is:

1. A method for automatically generating a new voice file from a script having at least one new speech pattern and a plurality of known speech patterns each having a known phonetic sequence associated therewith, the script having a text input and an audio input, the method comprising:

translating the text input to obtain a corresponding textual phonetic sequence in order to identify at least one new textual phonetic sequence corresponding to the at least one new speech pattern based on the plurality of known speech patterns;

translating the audio input to obtain a corresponding audio phonetic sequence;

aligning the text input and the corresponding textual phonetic sequence with the audio input and the corresponding audio phonetic sequence to obtain an alignment of the text input and the audio input of the script to identify at least one new audio phonetic sequence corresponding to the new at least one speech pattern; and generating the new voice file containing a portion of the audio input based on the at least one new audio phonetic sequence.

2. The method as recited in claim wherein the step of translating the text input includes the step of marking the at least one new speech pattern.

3. The method as recited in claim 2 wherein the step of marking includes the step of comparing the text input with the known phonetic sequences.

4. The method as recited in claim 2 further comprising the step of adding at least one new textual phonetic sequence corresponding to the at least one new speech pattern to a memory.

5. The method as recited in claim 2 wherein the step of generating includes the step of comparing the marked at least one new speech pattern with the aligned audio input.

6. The method as recited in claim 1 further comprising the step of editing the new voice file according to a predetermined set of rules.

7. The method as recited in claim 6 wherein the predetermined set of rules include reducing a level of at least one breath sound of the new voice file by a predetermined amount.

8. The method as recited in claim 6 wherein the predetermined set of rules include editing the new voice file at a zero crossing.

9. The method as recited in claim 6 wherein the predetermined set of rules include editing the new voice file in an inactive portion of the new voice file.

10. The method as recited in claim 6 wherein the predetermined set of rules include editing the new voice file in an active portion of the new voice file.

11. The method as recited in claim 10 wherein the predetermined set of rules include editing a beginning of the new voice file at a zero crossing in a zero to a positive direction.

12. The method as recited in claim 11 wherein the predetermined set of rules include editing an ending of the new voice file at a zero crossing in a negative to a zero direction.

13. The method as recited in claim 10 wherein the predetermined set of rules include editing a beginning of the new voice file at a zero crossing in a zero to a negative direction.

14. The method as recited in claim 13 wherein the predetermined set of rules include editing an ending of the new voice file at a zero crossing in a positive to a zero direction.

15. The method as recited in claim 6 wherein the predetermined set of rules include editing the new voice file at a predetermined amount of time before a beginning of the new voice file.

16. The method as recited in claim 6 wherein the predetermined set of rules include editing the new voice file at a predetermined amount of time after an ending of the new voice file.

17. The method as recited in claim 1 further comprising the step of storing the new voice file in a voice file memory.

18. The method as recited in claim 17 wherein the step of storing includes the step of assigning an identifier to the new voice file.

19. The method as recited in claim 1 further comprising the step of concatenating the new voice file with a selected portion of the plurality of known speech patterns to obtain a natural sounding voice message.

20. The method as recited in claim 1 wherein the step of translating the audio input includes the step of recording the script to obtain a voice recording.

21. The method as recited in claim 1 wherein the step of translating the audio input includes the step of providing a television audio signal and wherein the step of translating the text input includes the step of providing a closed caption decoding of the television audio signal.

22. A method for automatically generating at least one new voice file corresponding to at least one new text from a script incorporating a plurality of known text having corresponding pre-existing voice files associated therewith, the method comprising:

storing a plurality of phonetic sequences corresponding to the plurality of known text in a first memory;

providing a text input corresponding to a textual version of the script;

translating the text input to obtain a corresponding textual phonetic sequence based on the plurality of phonetic sequences stored in the first memory;

comparing the text input with the plurality of phonetic sequences stored in the first memory;

marking the at least one new text;

adding at least one new textual phonetic sequence corresponding to the at least one new text in the first memory, the at least one new textual phonetic transcript corresponding to the audio phonetic transcript of the at least one new text;

providing an audio input corresponding to an audio version of the script;

generating an audio phonetic sequence of the audio input by comparing the marked at least one new text with the aligned audio input;

aligning the text input and the corresponding textual phonetic sequence with the audio input and the corresponding audio phonetic sequence to obtain an alignment of the text input and the audio input of the script;

generating the at least one new voice file based on the alignment; and editing the at least one new voice file according to a predetermined set of rules, including reducing a level of at least one breath sound of the at least one new voice file by a predetermined amount.

23. The method as recited in claim 22 wherein the predetermined set of rules include editing the at least one new voice file at a zero crossing.

24. The method as recited in claim 22 wherein the predetermined set of rules include editing the at least one new voice file in an inactive portion of the at least one new voice file.

25. The method as recited in claim 22 wherein the predetermined set of rules include editing the at least one new voice file in an active portion of the at least one new voice file.

26. The method as recited in claim 25 wherein the predetermined set of rules include editing a beginning of the at least one new voice file at a zero crossing in a zero to a positive direction.

27. The method as recited in claim 26 wherein the predetermined set of rules include editing an ending of the at least one new voice file at a zero crossing in a negative to a zero direction.

28. The method as recited in claim 25 wherein the predetermined set of rules include editing a beginning of the at least one new voice file at a zero crossing in a zero to a negative direction.

29. The method as recited in claim 28 wherein the predetermined set of rules include editing an ending of the at least one new voice file at a zero crossing in a positive to a zero direction.

30. The method as recited in claim 22 wherein the predetermined set of rules include editing the at least one new voice file at a predetermined amount of time before a beginning of the at least one new voice file.

31. The method as recited in claim 22 wherein the predetermined set of rules include editing the at least one new voice file at a predetermined amount of time after ending of the at least one new voice file.

32. A system for automatically generating new voice file from a script having at least one new speech pattern and a plurality of known speech patterns each having a known phonetic sequence associated therewith, the script having a text input and an audio input, the system comprising:

means for translating the text input to obtain a corresponding textual phonetic sequence in order to identify at least one new textual phonetic sequence corresponding to the at least one new speech pattern based on the plurality of known speech patterns;

means for translating the audio input to obtain a corresponding audio phonetic sequence;

means for aligning the text input and the corresponding textual phonetic sequence with the audio input and the corresponding audio phonetic sequence to obtain an alignment of the text input and the audio input to identify at least one new audio phonetic sequence corresponding to the new speech pattern; and means for generating the new voice file containing a portion of the audio input based on the at least one new audio phonetic sequence.

33. The system as recited in claim 32 wherein the means for translating the text input further includes means for marking the at least one new speech pattern.

34. The system as recited in claim 33 wherein the means for translating the text input compares the text input with the known phonetic sequences.

35. The system as recited in claim 33 further comprising means for adding at least one new textual phonetic sequence corresponding to the at least one new speech pattern to a memory.

36. The system as recited in claim 33 wherein the means for generating includes means for comparing the marked at least one new speech pattern with the aligned audio input.

37. The system as recited in claim 32 further comprising means for editing the new voice file according to a predetermined set of rules.

38. The system as recited in claim 37 wherein the predetermined set of rules include reducing a level of at least one breath sound of the new voice file by a predetermined amount.

39. The system as recited in claim 37 wherein the predetermined set of rules include editing the new voice file at a zero crossing.

40. The system as recited in claim 37 wherein the predetermined set of rules include editing the new voice file in an inactive portion of the new voice file.

41. The system as recited in claim 37 wherein the predetermined set of rules include editing the new voice file in an active portion of the new voice file.

42. The method as recited in claim 41 wherein the predetermined set of rules include editing a beginning of the new voice file at a zero crossing in a zero to a positive direction.

43. The method as recited in claim 42 wherein the predetermined set of rules include editing an ending of the new voice file at a zero crossing in a negative to a zero direction.

44. The method as recited in claim 41 wherein the predetermined set of rules include editing a beginning of the new voice file at a zero crossing in a zero to a negative direction.

45. The method as recited in claim 44 wherein the predetermined set of rules editing an ending of the new voice file at a zero crossing in a positive to a zero direction.

46. The system as recited in claim 37 wherein the predetermined set of rules include editing the new voice file at a predetermined amount of time before a beginning of the new voice file.

47. The system as recited in claim 37 wherein the predetermined set of rules include editing the new voice file at a predetermined amount of time after an ending of the new voice file.

48. The system as recited as recited in claim 22 further comprising a voice file memory for storing the new voice file.

49. The system as recited in claim 48 further comprising means for assigning an identifier to the new voice file.

50. The system as recited in claim 48 further comprising means for concatenating the new voice file with a selected portion of the plurality of known speech patterns to obtain a natural sounding voice message.

51. The system as recited in claim 32 wherein the means for translating the audio input include means for recording the script to obtain a voice recording.

52. The system as recited in claim 51 wherein the means for recording in a microphone.

53. The system as recited in claim 32 wherein the audio input is a television audio signal and wherein the text input is a closed caption decoding of the television audio signal.

54. The system as recited in claim 32 wherein the means for translating text input is a text-to-phonetic translator.

55. The system as recited in claim 32 wherein the means for translating the audio input is a speech recognizer.

56. The system as recited in claim 32 wherein the means for aligning is a text-to-speech aligner.

57. The system as recited in claim 32 wherein the means for translating the audio input and the means for aligning is a text-to-speech aligner.

58. A system for automatically generating at least one new voice file corresponding to at least one new text from a script incorporating a plurality of known text having corresponding pre-existing voice files associated therewith, the system comprising:

first memory for storing a plurality of phonetic sequences corresponding to the plurality of known text;

means for providing a text input corresponding to a textual version of the script;

means for translating text input to obtain a corresponding textual phonetic sequence based on a comparison of the textual version of the script with the plurality of phonetic sequences stored in the first memory;

means for marking the at least one new text;

means for adding at least one new textual phonetic sequence corresponding to the at least one new text in the first memory, the new textual phonetic transcript corresponding to the audio phonetic transcript of the at least one new text;

means for providing an audio input corresponding to an audio version of the spirit;

first means for generating an audio phonetic sequence of the audio input;

means for aligning the text input and the corresponding textual phonetic sequence with the audio input and the corresponding audio phonetic sequence to obtain an alignment of the text input and the audio input;

second means for generating the at least one new voice file based on the alignment based on a comparison of the marked at least one new text with the aligned audio input; and means for editing the at least one new voice file according to a predetermined set of rules, including reducing a level of at least one breath sound of the at least one new voice file by a predetermined amount.

59. The system as recited in claim 58 wherein the predetermined set of rules include editing the new voice file at a zero crossing.

60. The system as recited in claim 58 wherein the predetermined set of rules include editing the new voice file in an inactive portion of the new voice file.

61. The system as recited in claim 58 wherein the predetermined set of rules include editing the new voice file in an active portion of the new voice file.

62. The system as recited in claim 61 wherein the predetermined set of rules include editing a beginning of the at least one new voice file at a zero crossing in a zero to a positive direction.

63. The system as recited in claim 62 wherein the predetermined set of rules include editing an ending of the at least one new voice file at a zero crossing in a negative to a zero direction.

64. The system as recited in claim 61 wherein the predetermined set of rules include editing a beginning of the at least one new voice file at a zero crossing in a zero to a negative direction.

65. The system as recited in claim 64 wherein the predetermined set of rules include editing an ending of the at least one new voice file at a zero crossing in a positive to a zero direction.

66. The system as recited in claim 58 wherein the predetermined set of rules include editing the new voice file at a predetermined amount of time before a beginning of the new voice file.

67. The system as recited in claim 58 wherein the predetermined set of rules include editing the new voice file at predetermined amount of time after an ending of the new voice file.

* * * * *

UNITED STATES PATENT AND TRADEMARK OFFICE
CERTIFICATE OF CORRECTION

PATENT NO. : 5,737,725
DATED : April 7, 1998
INVENTOR(S) : Eliot M. Case

It is certified that error appears in the above-identified patent and that said Letters Patent is hereby corrected as shown below: On the title page, item [73]:

Please change assignee from "U S WEST Marketing Resources Group, Inc." to "U S WEST, Inc."

Signed and Sealed this

Twenty-third Day of March, 1999

Attest:

Attesting Officer

Q. TODD DICKINSON

Acting Commissioner of Patents and Trademarks